United States Patent
Aubry et al.

(10) Patent No.: US 6,238,286 B1
(45) Date of Patent: May 29, 2001

(54) CROP RESIDUE SPREADER

(75) Inventors: Daniel John Aubry, Moline; Jerome Lawrence Weber, Rock Island, both of IL (US); Sheldon Joseph Grywacheski, Eldridge, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/369,641

(22) Filed: Aug. 6, 1999

(51) Int. Cl.[7] .................................................. A01F 12/30
(52) U.S. Cl. ........................................... 460/111; 460/112
(58) Field of Search ............................ 460/111, 39, 42, 460/112, 901, 71, 63, 69, 75; 239/673, 682; 56/13.3, 16.6

(56) References Cited

U.S. PATENT DOCUMENTS

| | | | |
|---|---|---|---|
| 4,591,102 | 5/1986 | Clarke | 239/655 |
| 4,617,942 | 10/1986 | Garner | 130/27 R |
| 4,735,216 | 4/1988 | Scott et al. | 130/27 R |
| 4,917,652 | * 4/1990 | Glaubitz et al. | 460/111 |
| 5,082,186 | 1/1992 | Bruns | 239/682 |
| 5,215,500 | * 6/1993 | Kirby | 460/111 |
| 5,433,664 | * 7/1995 | Bonde | 460/111 |
| 5,769,711 | * 6/1998 | Roberg | 460/73 |
| 5,797,793 | * 8/1998 | Matousek et al. | 460/111 |
| 5,833,533 | * 11/1998 | Roberg | 460/112 |
| 5,976,011 | * 11/1999 | Hartman | 460/111 |

FOREIGN PATENT DOCUMENTS

0212337 * 3/1987 (EP) ..................................... 460/111

* cited by examiner

Primary Examiner—Thomas B. Will
Assistant Examiner—Árpád Fáb Kovács

(57) ABSTRACT

A crop residue spreader for a combine harvester is pivotally mounted to the combine for rotation about a transverse axis. The spreader has a spreading position in which crop residue is spread over a wide area at the rear of the combine. The spreader is rotatable about the transverse axis to a raised windrowing position to allow the residue to fall to the ground in a windrow for later collection. The disks of the spreader are covered by shrouds above and to the sides to reduce the upward dispersal of the residue. Gas assist cylinders are provided to lift the spreader to the windrow position after which a latch is engaged to hold the spreader there. A hold down latch operates to hold the spreader in the spreading position in opposition to the gas assist cylinders.

11 Claims, 4 Drawing Sheets

CROP RESIDUE SPREADER

BACKGROUND OF THE INVENTION

1. Field of the Invention

The present invention relates to a crop residue spreader for a combine and in particular to a spreader that is pivotally mounted to the combine for movement between a spreading position and a windrowing position.

2. Description of the Related Art

Management of crop residue, i.e. straw and chaff, at the time of harvesting is becoming of greater importance with the increased use of reduced tillage or no-tillage farming practices. By widely dispersing the crop residue, as opposed to dropping the residue in a narrow width row immediately behind the combine, the residue is more evenly distributed across the ground. This produces benefits during the spring planting season including greater uniformity in soil temperature and greater uniformity in ground conditions for operation of seeding equipment. It is known to spread the residue at the rear of the combine with one or two rotating disks. The rotating disks disperse the residue over a wide area behind the combine. Such spreaders work well as long as the operator desires to spread the residue. If the operator wishes to windrow the residue for later collection, it is often necessary to remove the spreader to provide a clear path for the crop residue to fall to the ground. This is a time consuming process.

SUMMARY OF THE INVENTION

Accordingly, it is an object of the present invention to provide a spreader that is movably mounted to the combine for movement between a spreading position in which the crop residue is dispersed and an inoperative windrowing position in which the crop residue is dropped from the combine in a narrow width windrow.

The spreader of the present invention has one, or preferably two, rotating disks mounted to a frame at the rear of the combine. The disks have raised radial ribs to engage and disperse the crop residue as they rotate. The rotating disks also act as a fan, creating airflow to further propel the residue. The frame is rotatably mounted to the combine for rotation about a transverse pivot axis. The frame and disks are pivoted to a raised position in which the crop residue is able to drop from the combine in front of the spreader. A top shroud is carried by the frame and spaced above the disks to prevent upward dispersal of the residue. In addition, side shrouds extend laterally outward from the top shroud, beyond the combine side sheets to control the distribution of the residue. Front shrouds are mounted to the combine forward of the side shrouds and outboard of the side sheets.

Gas assist cylinders are provided to urge the spreader to the raised, windrowing position. A hold down latch acts in opposition to the gas assist cylinders to retain the spreader in the spreading position.

DESCRIPTION OF THE PREFERRED EMBODIMENT

Figure 1:
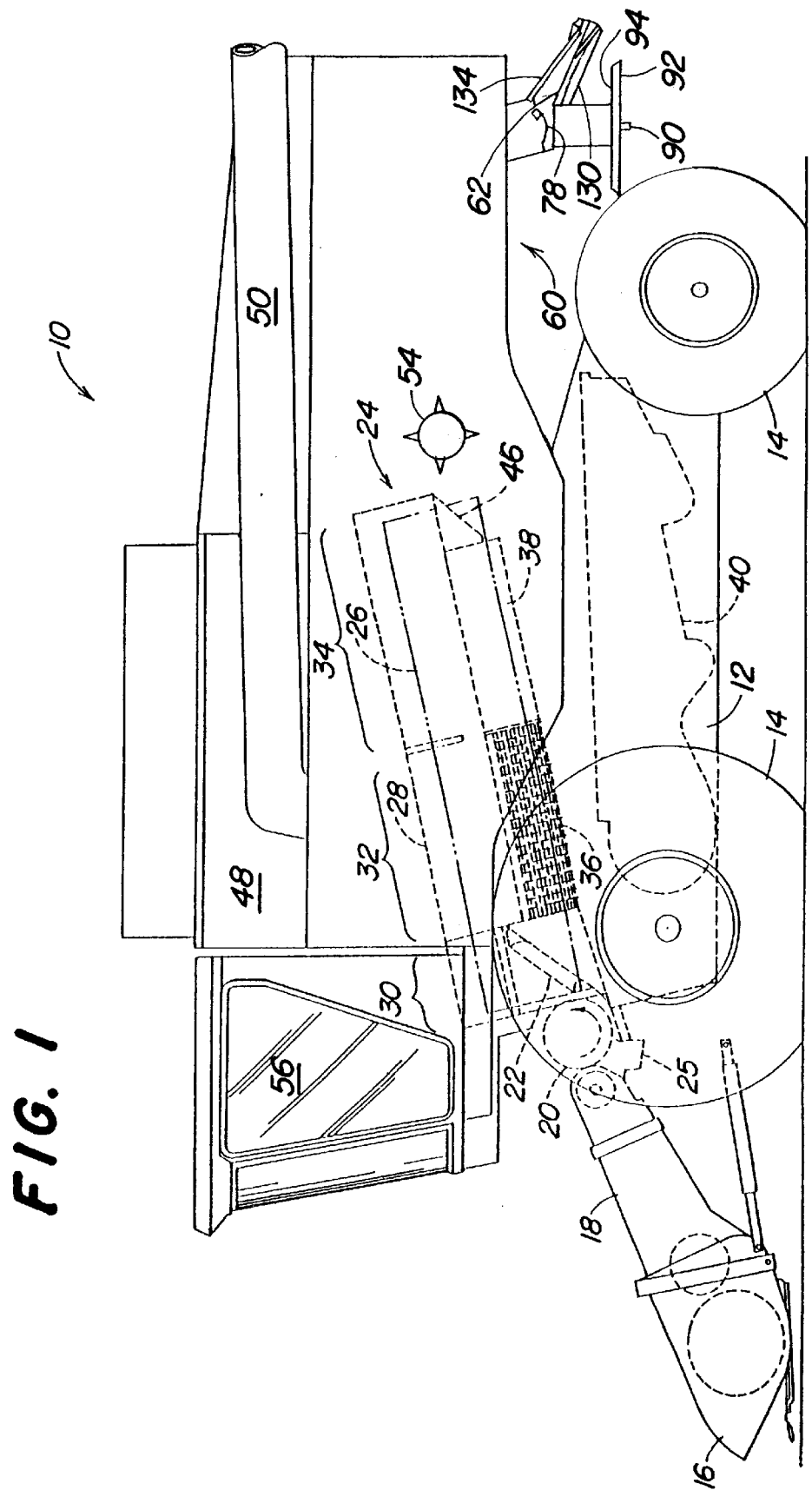
FIG. 1 is a semi-schematic side elevation of a combine having the residue spreader of the present invention.

An agricultural combine 10 is shown in FIG. 1. The combine 10 includes, among other things, a supporting structure formed by a pair of upright side sheets 12, only one of which is shown in FIG. 1. The combine also includes ground engaging wheels 14. A harvesting platform 16 is used to harvest a crop and direct it to a feederhouse 18. The harvested crop is directed by the feederhouse to a beater 20. The beater directs the crop upwardly, through the inlet transition section 22 to a rotary crop-processing unit 24. A rock trap 25 is positioned between the feederhouse and the beater 20.

The rotary crop-processing unit 24 threshes and separates the harvested crop material. It comprises a rotor or rotating member 26 radially surrounded by a casing 28. The rotor and the casing together define an inlet section 30, a threshing section 32 and a separating section 34. The rotor 26 comprises a hollow cylindrical drum having a plurality of crop-processing elements that engage the crop and rotate it in the casing 28. The bottom of the casing has a concave 36 under the threshing section 32 and a separating grate 38 under the separating section 34.

Grain and chaff falling through the concave 36 and the separating grate 38 are directed to a cleaning system 40. The cleaning system 40 includes a fan, a sieve and a chaffer in a known manner. The air blast from the fan blows through the sieve and the chaffer, blowing the chaff upward and rearward while the grain is allowed to fall through the sieve and chaffer to a clean grain elevator (not shown). The clean grain elevator deposits the clean grain in a grain tank 48. The clean grain in the tank 48 can be unloaded into a grain cart or truck by unloading auger 50. The operation of the combine is controlled from the operator's cab 56.

Threshed and separated crop residue is discharged from the rotary crop-processing unit 24 through outlet 52 to a discharge beater 54. The discharge beater in turn propels the residue out of the combine, through a lower rear opening 60 rearward of the cleaning system 40. A spreader 62 is mounted to the side sheets at the opening 60. When the spreader is in the spreading position, it receives the crop residue and distributes it over a wide area behind the combine. While the spreader 62 is shown in connection with a combine having a rotary separator, the spreader of the present invention can be used with combines having other types of separators, including straw walkers.

Figure 3:
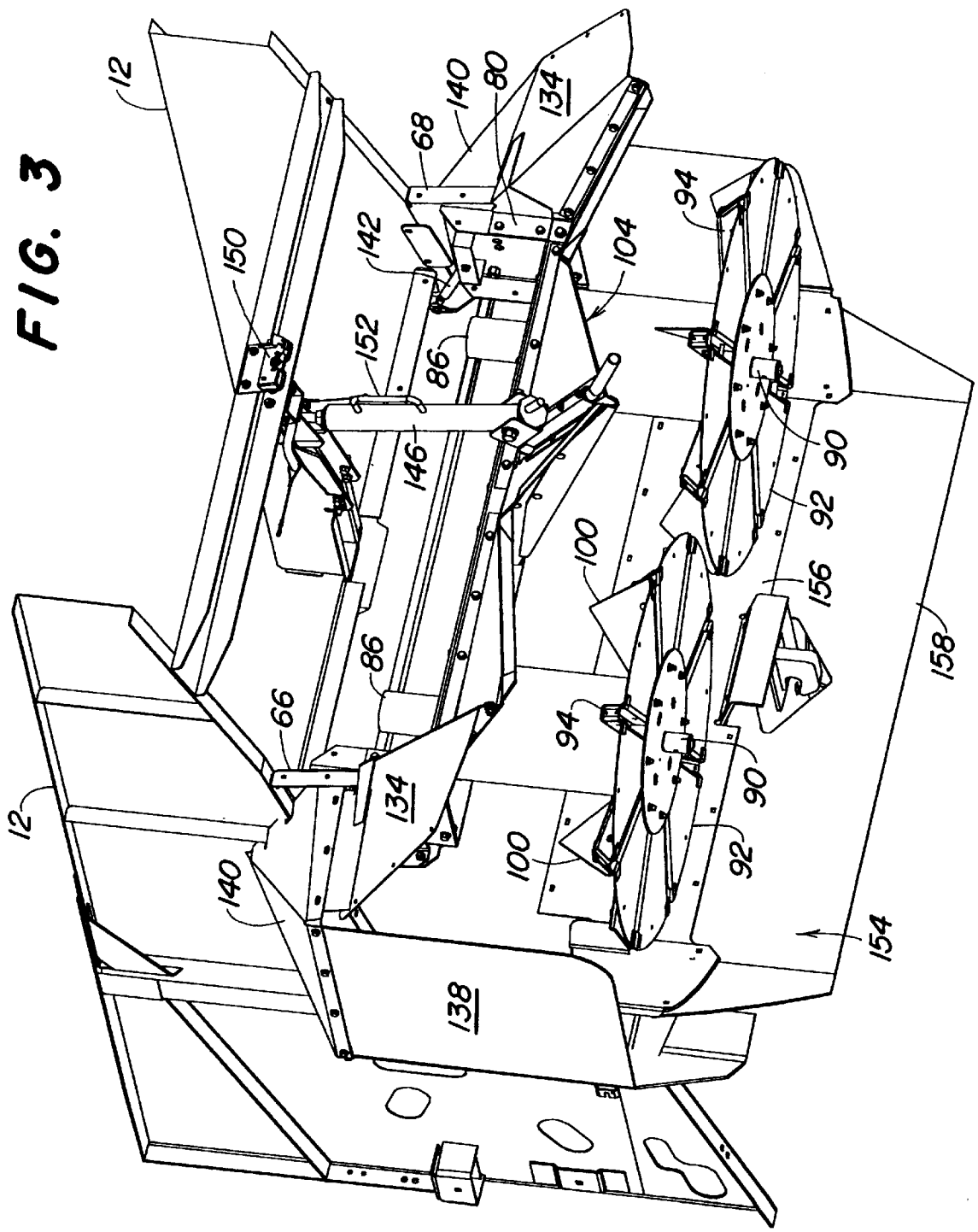
FIG. 3 is an upward looking perspective view of the spreader of the present invention in the spreading position.

The combine structure includes two outer side panels 66 and 68 and an upright front panel 70 joined to the combine side sheets 12 as shown in FIG. 3. A spreader frame 74 is attached to the side panels 66, 68 at pivots 76, one at each side of the spreader. The frame 74 includes two inner side panels 78 and 80 and a lower panel 82. The two pivots 76 couple the inner panels of the frame 74 to the outer side panels 66, 68 and define a transverse pivot axis 84.

Hydraulic motors 86 are mounted to the frame lower panel 82. Each motor has an output shaft 90 that extends downward from the motor below the lower panel 82. A disk 92 is coupled to each output shaft 90 for rotation therewith. The disks 92 are formed with raised radial ribs 94. The disks 92 counter-rotate as shown by the arrows 96 in FIG. 2. Optional blades 100 may be mounted to the radial ribs 94 with fasteners 102 extending through the apertures 98 in the ribs. The blades may be mounted on some or all of the ribs 94, as long as the disk remains balanced. The crop residue exiting the combine through the opening 60 is engaged by the ribs and blades of the rotating disks 92 to propel the residue over a wide width behind the combine. The blades function as a fan to draw air from the combine and create airflow to the rear and to the side to assist in the dispersal of the residue.

Shrouding is provided over and around the disks 92 to help direct the crop residue as it is distributed. The shrouding includes a top shroud 104 over each of the disks 92, rearward of the shafts 90. Each top shroud 104 is coupled to the lower panel 82 by a plurality of nut and bolt fasteners 106. The top shrouds 104 are generally formed of three sections, a shroud center section 110, a shroud inner section 116 and a shroud outer section 120. The three sections are all generally triangular in shape. The top shrouds 104 are preferably each formed as a single piece of stamped sheet metal having a fold 112 between the center section 110 and the inner section 116 and a fold 114 between the center section 110 and the outer section 120. The sections could be made as separate components bolted together. The shroud center section 110 has a front edge 111 that is fastened to the lower panel 82.

The three shroud sections slope downwardly from the front edge 111. The inner sections 116 also slope toward an inner lower corner 122 while the outer sections 120 slope toward outer lower corners 124. The inner sections 116 and the outer sections 120 have a greater downward slope than does the center section 110. The inner lower corners 122 are slightly lower than the outer lower corners 124.

Figure 4:
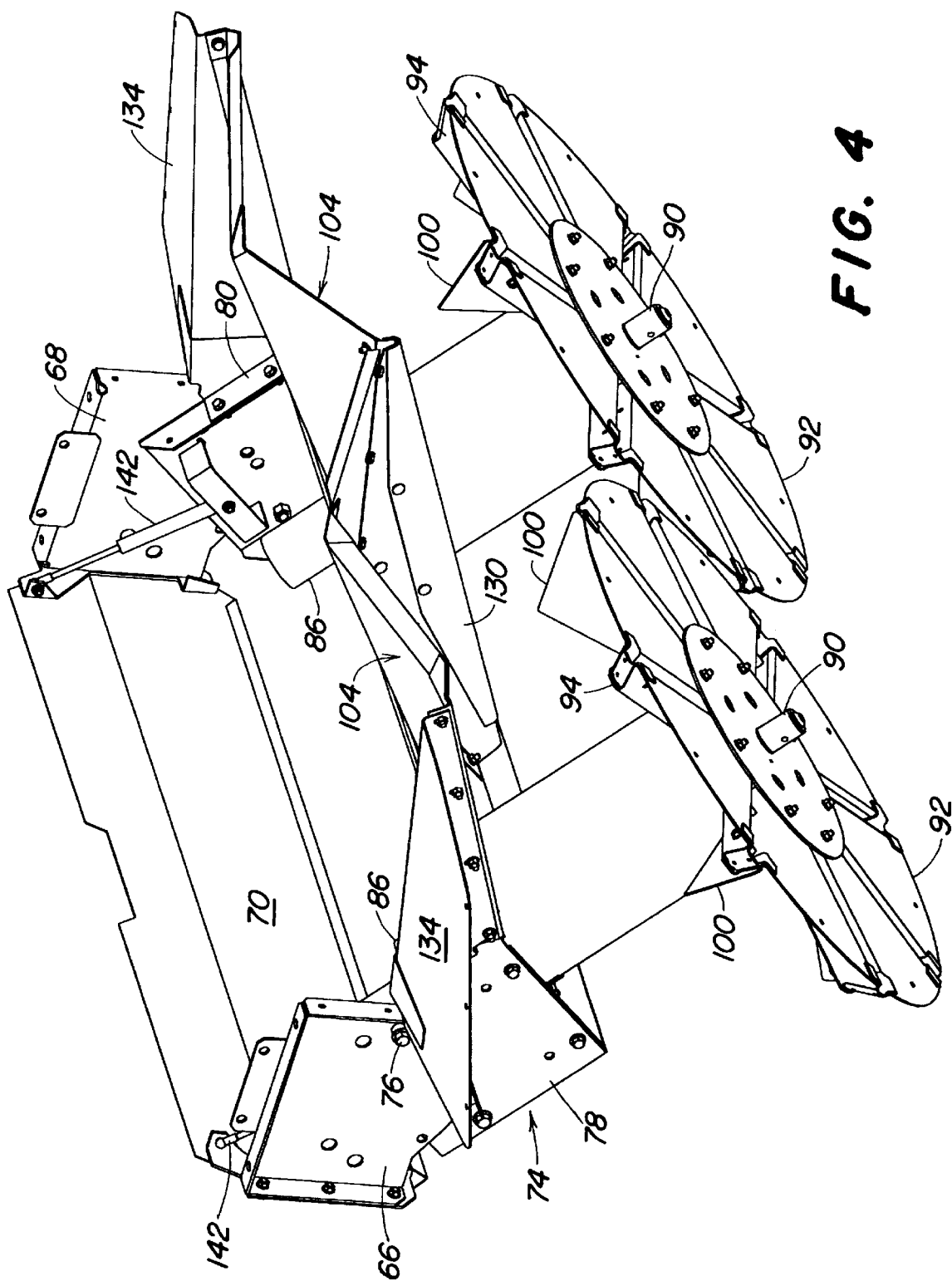
FIG. 4 is a perspective view of the spreader of the present invention in the windrowing position.

A divider 130 between the two top shrouds 104 extends downwardly from the center and inner shroud sections 110, 116 toward the disks 92 as best seen in FIG. 4. The divider 130 serves to separate the flow of the crop residue between the two disks 92.

Side shrouds 134 are fastened along outer edges 136 of the top shrouds 104. The side shrouds 134 first extend upward and then project outward from the outer edges 136. Additional front shrouds 140 (FIG. 3) are provided forward of the side shrouds 134. The front shrouds 140 are fastened to the combine side sheets and extend outwardly beyond the side sheets. A skirt 138 may be added to and depend from the front shrouds 140. The top shrouds 104, side shrouds 134 and front shrouds 140 operate to keep the residue from being dispersed upward.

A bottom panel 154, FIG. 3, extends downward at the rear of the cleaning system 40, in front of the disks 92. The bottom panel has an upper metal portion 156 and a lower depending skirt 158. The skirt gives the panel flexibility in accessing areas of the combine in front of the panel. The bottom panel 154 helps to prevent forward dispersal of the crop residue.

Figure 2:
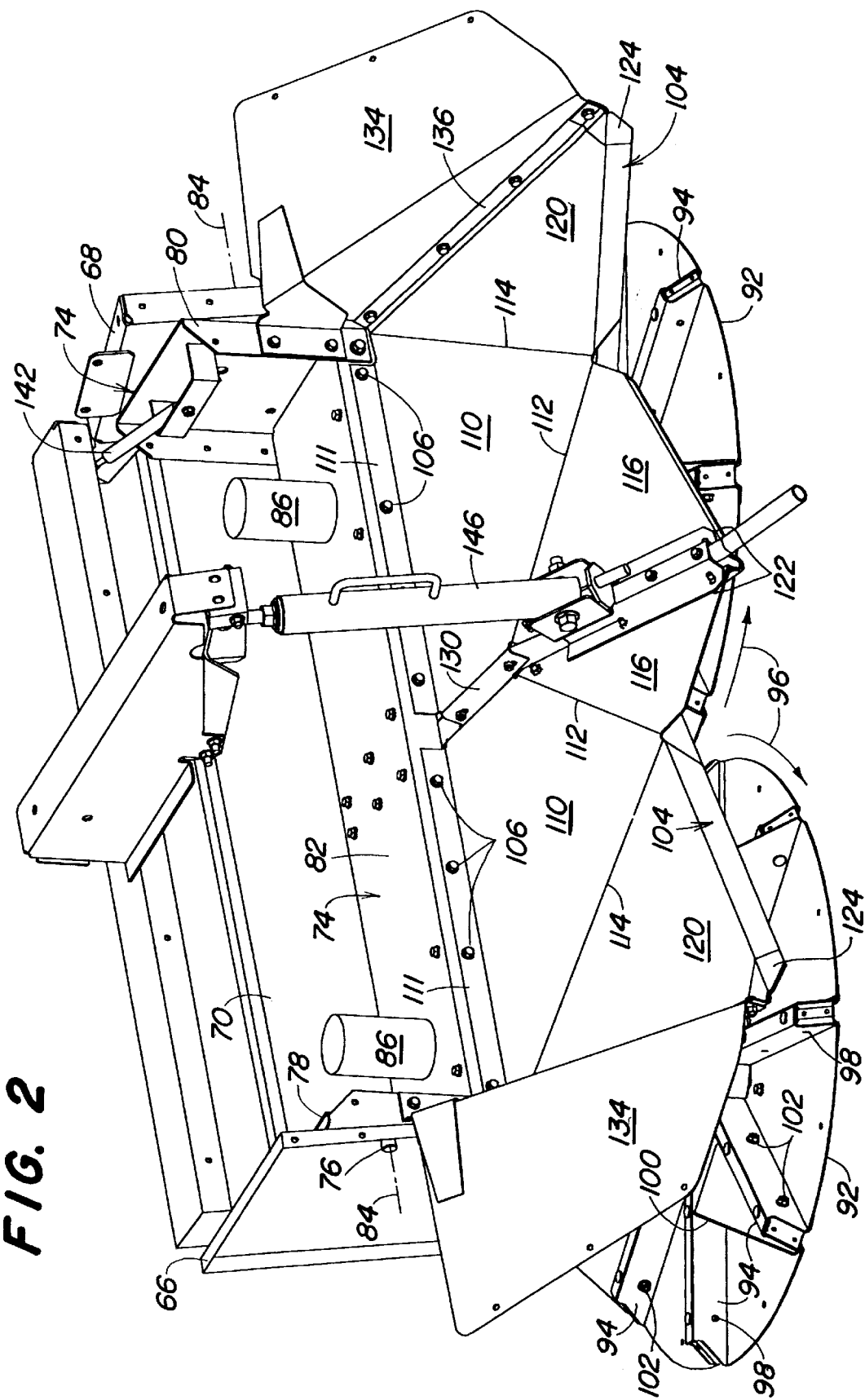
FIG. 2 is a downward looking perspective view of the spreader of the present invention in the spreading position.

The spreader frame 74 has a spreading position shown in FIGS. 1–3 in which the shafts 90 are oriented generally vertically and the disks generally horizontally. This is an operative spreading position in which crop residue from the combine is received by the disks 92 and distributed thereby. In this position, the shrouding around the disks and the bottom panel 154 of the combine behind the cleaner 40 enable the rotating disks 92 to draw air from the combine cleaning system 40.

The frame 74 is rotatable about the pivot axis 84 to a rearwardly raised position shown in FIG. 3. This is a windrowing position in which the disks 92 are not rotated. The crop residue is allowed to fall from the combine through the opening 60 directly to the ground, without being dispersed over a wide area. This leaves the residue in a windrow for subsequent collection. Gas assist cylinders 142 are provided at each side of the spreader to facilitate lifting of the spreader to the windrowing position. The cylinders 142 extend between the frame 74 and the panel 70 of the combine structure. The gas assist cylinders provide a biasing force on the frame 74 to urge the frame to the windrowing position. Other biasing mechanisms may be used such as a spring. Furthermore, a powered lift mechanism such as a hydraulic cylinder or a motor driven lift linkage may also be used.

A hold down latch 146 extends between the combine frame above the spreader and the top shrouds 104. The hold down latch retains the spreader in the spreading position in opposition to the gas assist cylinders 142. The hold down latch 146 is manually released to enable the spreader to rotate to the windrowing position.

An upper latch 150 (FIG. 3) on the combine frame insures that the spreader remains in the windrowing position and that the weight of the spreader and vibration forces are not resisted solely by the gas assist cylinders 142. The upper latch 150 couples to a striker bar 152 on the hold down latch 146 to retain the frame 74 in the windrowing position. The latch 150 is manually released to lower the spreader to the spreading position. Once released, the operator manually pushes down on the top shrouds 104, in opposition to the gas assist cylinders 142, to return the spreader to the spreading position. The hold down latch 146 is then manually engaged to retain the spreader in the spreading position. One person can easily reposition the spreader from the spreading position to the windrowing position or vice versa in a matter of seconds.

The spreader of the present invention functions to effectively and evenly spread crop residue over a wide area at the rear of the combine. In addition, the spreader can easily be moved to a windrowing position without entirely removing the spreader from the combine. This avoids the difficult and time consuming process often required when it is desired to windrow the crop residue.

While the spreader has been shown and described as having a pair of disks, the invention can be used with a single disk. The invention should not be limited to the above-described embodiment, but should be limited solely by the claims that follow.

What is claimed is:

1. A spreader for a combine harvester having a structure and adapted to move over a field to gather and process an agricultural crop having straw which, after processing, is discharged from a separator as crop residue, the spreader comprising:

a pair of rotating disks each having one or more radial ridges, the disks being rotatably carried by a frame at the rear of the combine to receive and disperse the crop residue;

the frame being pivotally mounted to the combine structure for rotation about a transverse axis to move the disks between a generally horizontal spreading position and a raised windrowing position in which the crop residue is permitted to drop downward from the combine to the ground without being dispersed by the spreader;

a top shroud spaced above a rear portion of the disks to reduce upward dispersal of the crop residue, top shroud being carried by the frame for pivotal movement therewith; and side shrouds extending laterally from the top shroud outward beyond the combine structure and carried by the frame for pivotal movement therewith.

2. The spreader as defined by claim 1 further comprising front shrouds forward of the side shrouds and outboard of the combine structure, the front shrouds being fixedly mounted to the combine structure.

3. The spreader as defined by claim 1 wherein the top shroud, when the disks are in the generally horizontal spreading position, is generally sloped downward to the rear.

4. A spreader for a combine harvester having a structure and adapted to move over a field to gather and process an agricultural crop having straw which, after processing, is discharged from a separator as crop residue, the spreader comprising:
- a pair of rotating disks each having one or more radial ridges, the disks being rotatably carried by a frame at the rear of the combine to receive and disperse the crop residue;
- the frame being pivotally mounted to the combine structure for rotation about a transverse axis to move the disks between a generally horizontal spreading position and a raised windrowing position in which the crop residue is permitted to drop downward from the combine to the ground without being dispersed by the spreader; and
- a top shroud carried by the frame for pivotal movement therewith and spaced above a rear portion of the disks, the top shroud include a divider projecting downward toward the disks, generally between the two disks, to divide the flow of the crop residue toward the two disks.

5. A spreader for a combine harvester having a structure and adapted to move over a field to gather and process an agricultural crop having straw which, after processing, is discharged from a separator as crop residue, the spreader comprising:
- a pair of rotating disks each having one or more radial ridges, the disks being rotatable carried by a frame at the rear of the combine to receive and disperse the crop residue;
- the frame being pivotally mounted to the combine structure for rotation about a transverse axis to move the disks between a generally horizontal spreading position and a raised windrowing position in which the crop residue is permitted to drop downward from the combine to the ground without being dispersed by the spreader; and
- a top shroud spaced above a rear portion of the disks to reduce upward dispersal of the crop residue, the top shroud above each disk including three inclined sections joined to one another forming a center section, an inner section and an outer section above each disk.

6. The spreader as defined by claim 5 wherein the center, inner and outer sections are generally triangular in shape.

7. The spreader as defined by claim 6 wherein the center section is sloped downward and rearward from the frame and the inner and outer sections slope downward from the center section at a greater slope than the center section to inner and outer lower corners respectively.

8. The spreader as defined by claim 7 wherein the inner lower corner is lower than the outer lower corner.

9. A spreader for a combine harvester having a structure and adapted to move over a field to gather and process an agricultural crop having straw which, after processing, is discharged from a separator as crop residue, the spreader comprising:
- a pair of rotating disks each having one or more radial ridges, the disks being rotatably carried by a frame at the rear of the combine to receive and disperse the crop residue;
- the frame being pivotally mounted to the combine structure for rotation about a transverse axis to move the disks between a generally horizontal spreading position and a raised windrowing position in which the crop residue is permitted to drop downward from the combine to the ground without being dispersed by the spreader;
- bias means for continuously urging the frame upward to the windrowing position; and
- a first latch for holding the frame in the spreading position.

10. The spreader as defined by claim 9 wherein the biasing means includes a pair of gas assist cylinders.

11. The spreader as defined by claim 9 further comprising a second latch to hold the frame in the windrowing position whereby the load of the spreader is removed from the bias means.

* * * * *